(12) United States Patent
Johnson

(10) Patent No.: US 10,327,418 B2
(45) Date of Patent: Jun. 25, 2019

(54) RECREATIONAL DEVICE FOR PETS

(71) Applicant: Julie Johnson, Queensland (AU)

(72) Inventor: Julie Johnson, Queensland (AU)

( * ) Notice: Subject to any disclaimer, the term of this patent is extended or adjusted under 35 U.S.C. 154(b) by 104 days.

(21) Appl. No.: 15/441,958

(22) Filed: Feb. 24, 2017

(65) Prior Publication Data

US 2018/0168125 A1    Jun. 21, 2018

(30) Foreign Application Priority Data

Dec. 15, 2016    (AU) ................................ 2016905202

(51) Int. Cl.
| | | |
|---|---|---|
| *A01K 1/04* | (2006.01) | |
| *A01K 7/00* | (2006.01) | |
| *A01K 27/00* | (2006.01) | |
| *A45B 23/00* | (2006.01) | |
| *E04H 12/22* | (2006.01) | |
| *A45B 25/00* | (2006.01) | |

(52) U.S. Cl.
CPC ................. *A01K 1/04* (2013.01); *A01K 7/00* (2013.01); *A01K 27/005* (2013.01); *A45B 23/00* (2013.01); *A45B 25/00* (2013.01); *E04H 12/2238* (2013.01); *A45B 2023/0012* (2013.01); *A45B 2025/003* (2013.01); *A45B 2200/1009* (2013.01); *A45B 2200/1054* (2013.01)

(58) Field of Classification Search
CPC ..................................... A01K 1/04; A01K 7/00
USPC ........................................................... 119/72
See application file for complete search history.

(56) References Cited

U.S. PATENT DOCUMENTS

| | | | | |
|---|---|---|---|---|
| 390,808 | A * | 10/1888 | Sergeant | A01K 1/04 119/781 |
| 429,111 | A * | 6/1890 | Bailey | A01K 1/04 119/786 |
| 1,786,613 | A | 12/1930 | Hooper et al. | |
| 2,481,559 | A * | 9/1949 | Ashbaugh | A01K 1/04 119/797 |
| 3,138,387 | A | 6/1964 | Michel et al. | |
| 4,296,693 | A | 10/1981 | Archer | |
| 4,334,503 | A * | 6/1982 | Carey, Jr. | A01K 27/003 119/786 |
| 4,491,091 | A * | 1/1985 | Satterfield | A01K 1/04 119/780 |
| 4,546,730 | A * | 10/1985 | Holland | A01K 5/0114 119/61.57 |
| 4,766,848 | A * | 8/1988 | Rocco | A01K 1/04 119/701 |
| 4,796,566 | A * | 1/1989 | Daniels | A01K 1/04 119/789 |

(Continued)

FOREIGN PATENT DOCUMENTS

| | | | | | |
|---|---|---|---|---|---|
| CA | | 2765871 A1 * | 2/2011 | ............. | A01K 1/04 |
| DE | | 3237960 A1 * | 4/1984 | ............. | A01K 1/04 |

*Primary Examiner* — Monica L Williams
*Assistant Examiner* — Aaron M Rodziwicz
(74) *Attorney, Agent, or Firm* — Allen, Dyer, Doppelt + Gilchrist, PA

(57) ABSTRACT

A restraint device is for an animal. The restraint device may include a base attached to a ground, a shaft supported in the base, and a rotatable attachment point on the shaft for a leash for the animal. The shaft is flexible so that it is able to absorb force from the leash. The restraint device may include a platform configured to wrap around the base to provide stability for the base.

18 Claims, 4 Drawing Sheets

(56) References Cited

U.S. PATENT DOCUMENTS

| | | | |
|---|---|---|---|
| 5,022,351 A * | 6/1991 | Daniels | A01K 1/04 119/789 |
| 5,031,577 A * | 7/1991 | Flugger | A01K 1/04 119/780 |
| 5,112,023 A | 5/1992 | Sowers | |
| 5,161,487 A * | 11/1992 | Miller | A01K 1/04 119/780 |
| 5,199,361 A | 4/1993 | Robinson | |
| 5,243,795 A | 9/1993 | Roberts | |
| 5,343,887 A | 9/1994 | Danaher | |
| 5,474,273 A | 12/1995 | Vinal | |
| 5,526,774 A * | 6/1996 | Swindall, Jr. | A01K 1/04 119/787 |
| 5,732,659 A | 3/1998 | Wiggins | |
| 5,870,974 A * | 2/1999 | Johnson | A01K 1/04 119/786 |
| 5,957,092 A * | 9/1999 | Colsch | A01K 1/04 119/787 |
| 5,971,668 A * | 10/1999 | Miller | A62B 35/0068 119/770 |
| 6,109,282 A | 8/2000 | Yoon | |
| 6,149,135 A | 11/2000 | Hlavin | |
| 6,170,692 B1 | 1/2001 | Johnston | |
| 6,209,878 B1 | 4/2001 | Munro | |
| 6,237,540 B1 * | 5/2001 | Vandracsek | A01K 1/04 119/791 |
| 6,328,665 B1 | 12/2001 | Gormley | |
| 6,374,771 B1 * | 4/2002 | Zwickle | A01K 1/0353 119/28.5 |
| 6,374,777 B1 * | 4/2002 | Willinger | A01K 1/04 119/787 |
| 6,402,643 B1 | 6/2002 | Gill | |
| 6,517,444 B1 | 2/2003 | Yoon | |
| 6,659,476 B2 | 12/2003 | Weida | |
| 6,684,812 B1 | 2/2004 | Tucker | |
| 6,732,985 B1 | 5/2004 | Cantrell | |
| 6,820,573 B1 * | 11/2004 | McMullin | A01K 1/04 119/786 |
| 6,854,426 B2 | 2/2005 | Campbell et al. | |
| 6,981,680 B1 | 1/2006 | Gordon et al. | |
| 7,314,406 B2 | 1/2008 | Bilinovich | |
| 7,353,775 B1 * | 4/2008 | Stelmach | A01K 1/04 119/61.54 |
| 7,984,698 B1 * | 7/2011 | Collins | A01K 1/04 119/780 |
| 2002/0066417 A1 * | 6/2002 | Frazer | A01K 1/04 119/769 |
| 2002/0112675 A1 * | 8/2002 | Lesko | A01K 1/04 119/786 |
| 2002/0183128 A1 | 12/2002 | Cho | |
| 2003/0066493 A1 * | 4/2003 | Scheid | A01K 1/04 119/787 |
| 2003/0136438 A1 * | 7/2003 | Kindell | A01K 1/04 135/118 |
| 2003/0146426 A1 | 8/2003 | Ray et al. | |
| 2004/0164084 A1 | 8/2004 | Cooper | |
| 2004/0216697 A1 * | 11/2004 | Wojcik | A01K 1/04 119/786 |
| 2005/0132980 A1 * | 6/2005 | Haddad | A01K 1/04 119/787 |
| 2006/0011147 A1 * | 1/2006 | Krieger | A01K 1/04 119/788 |
| 2007/0137588 A1 * | 6/2007 | Bean | A01K 1/04 119/789 |
| 2007/0215064 A1 * | 9/2007 | Petersen | A01K 1/04 119/786 |
| 2007/0289555 A1 | 12/2007 | Campbell | |
| 2008/0314336 A1 * | 12/2008 | Church | A01K 1/0236 119/771 |
| 2009/0301403 A1 * | 12/2009 | Stuerke | A01K 1/04 119/780 |
| 2010/0224139 A1 * | 9/2010 | Krieger | A01K 1/04 119/780 |
| 2011/0067647 A1 * | 3/2011 | Franklin | A01K 1/04 119/769 |
| 2012/0227678 A1 * | 9/2012 | Milani | A01K 1/04 119/712 |
| 2013/0092088 A1 * | 4/2013 | Sharp | A01K 1/04 119/61.5 |
| 2014/0190419 A1 * | 7/2014 | Harding | A01K 5/0142 119/51.5 |
| 2014/0283759 A1 * | 9/2014 | Bianchi | A01K 1/04 119/771 |
| 2015/0173326 A1 * | 6/2015 | Pittman | A01K 1/04 119/780 |
| 2016/0066541 A1 * | 3/2016 | Storum | A01K 15/04 119/756 |
| 2018/0092333 A1 * | 4/2018 | Skinner | A01K 27/004 |

\* cited by examiner

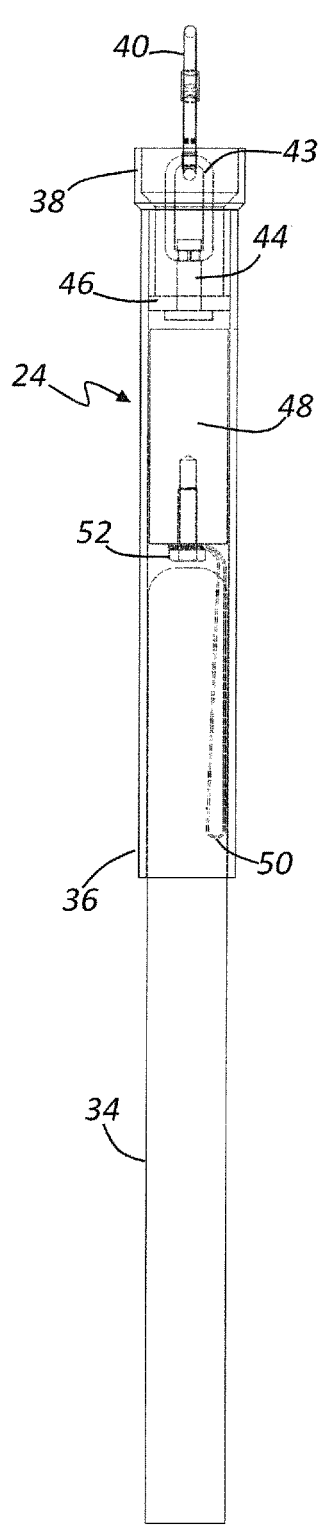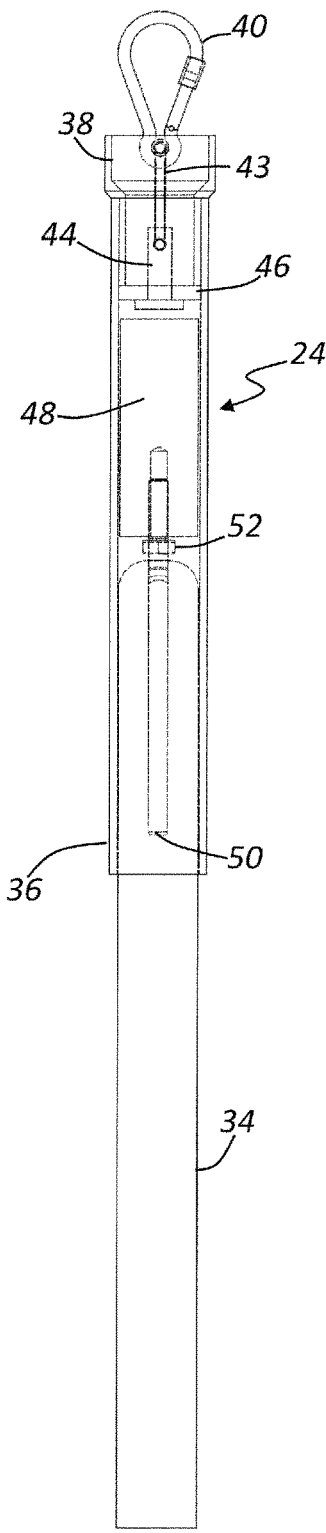
*Figure 5*     *Figure 6*

RECREATIONAL DEVICE FOR PETS

RELATED APPLICATION

This application is based upon prior filed copending Australian Application No. 2016905202 filed Dec. 15, 2016, the entire subject matter of which is incorporated herein by reference in its entirety.

TECHNICAL FIELD

The present invention relates to lifestyle and recreational products for pets and, more particularly to a pet restraint.

BACKGROUND

Many parks, beaches and other public places require that dogs be on a leash at all times. Dog owners are limited in their ability to relax in these public places due to the fact that they have to restrain their dogs at all times.

A stake can be placed into the ground and a leash can be tied to it. However, stakes can be levered out of the ground by a dog pulling on the leash. Moreover, stakes are only adapted to be placed in dirt, and not on other surfaces, such as sand, concrete, timber decks, snow or rocky terrain.

A portable restraint for a dog was disclosed in prior art United States Patent publication number U.S. Patent Application Publication No. 2007/0289555 to Campbell (although this does not constitute an admission that the publication forms part of the common general knowledge in the art in Australia or in any other country). However, that portable restraint can be easily tipped over by a dog. In addition, the restraint can also choke the dog if it puts sufficient force on the leash.

SUMMARY

Generally speaking, a restraint device is for an animal. The restraint device may include a base attached to a ground, a shaft supported in the base, and a rotatable attachment point on the shaft for a leash for the animal, the shaft being flexible so that it is able to absorb force from the leash.

BRIEF DESCRIPTION OF THE DRAWINGS

FIG. 5 is a side sectional view of the flexible shaft of the restraint device of FIG. 1.

FIG. 6 is a side sectional view of the flexible shaft of FIG. 5 rotated from the view of FIG. 5.

DETAILED DESCRIPTION

The object of the present invention to overcome or at least substantially ameliorate the aforementioned problems of the prior art. According to the present invention there is provided a restraint device for an animal, the device comprising: (a) a base attached to the ground; (b) a shaft supported by the base; and (c) an attachment point on the shaft for a leash for the animal, wherein the shaft is flexible so that it is able to absorb force from the leash.

Preferably, the height of the shaft which is supported in the base is adjustable. The height of the shaft may be adjusted by using a bung which is inserted into the shaft and causes it to bulge at a point where it abuts a hole in the base and thereby affixes the height of the shaft in the base. The device preferably also includes a plug which is affixed to the end of the shaft within the base and is wider than the hole in the base so that the shaft cannot be fully withdrawn out of the top of the base.

Preferred forms of the device include a platform. The platform is preferably adapted to wrap around the base for ease of storage and transportation. The platform is preferably adapted to be covered with material to provide stability for the base. More preferably, the base is adapted to be attached to the ground.

The shaft is preferably adapted to receive a shade implement. It is also preferred that the base contains a storage compartment. The storage compartment may be adapted to hold water. The base may contain a dispenser for the water which can be activated by the user of the device. Any of the features described herein can be combined in any combination with any one or more of the other features described herein within the scope of the invention.

Figure 1:
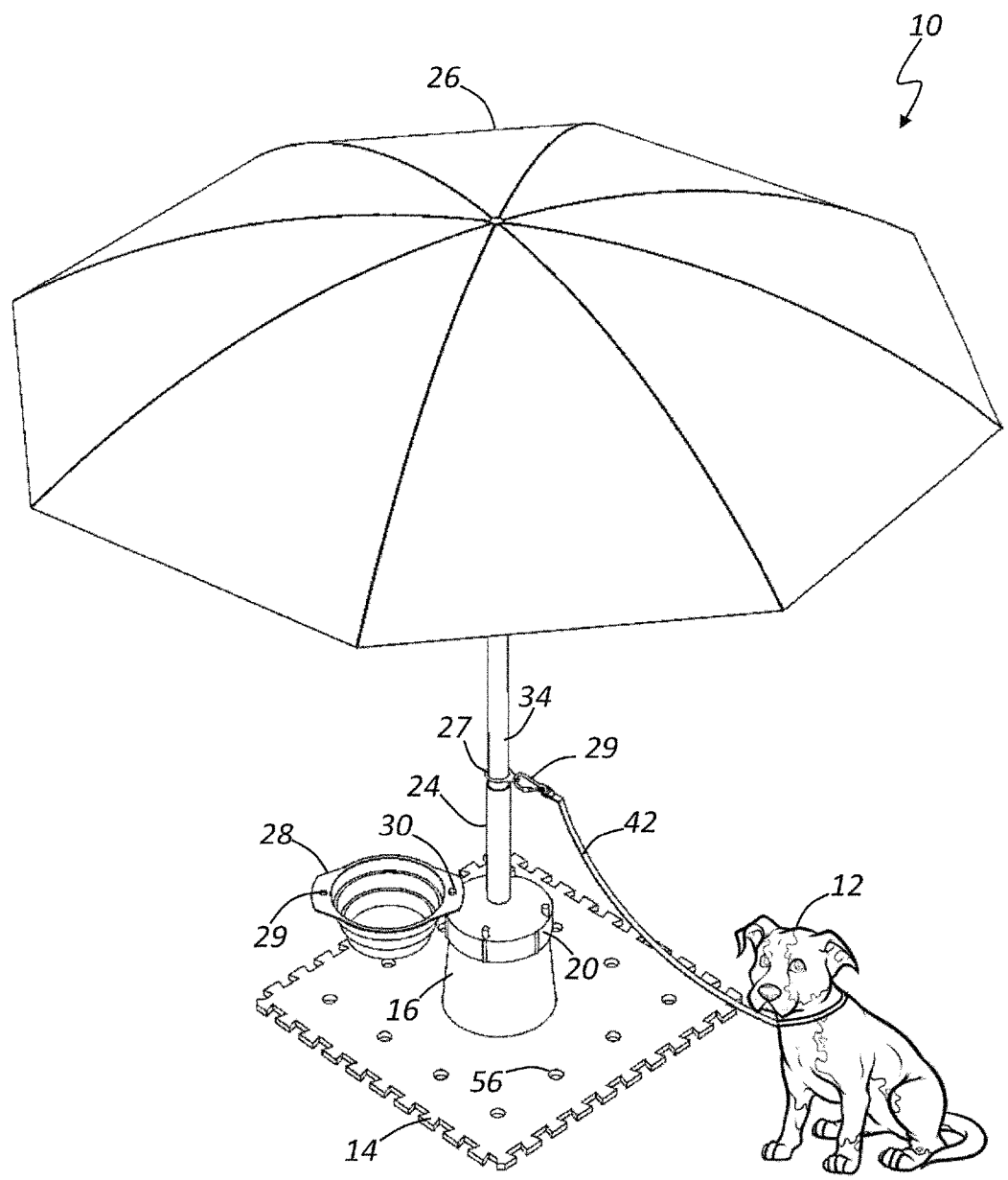
FIG. 1 is a perspective view of a restraint device according to an embodiment of the present invention.
Figure 3:
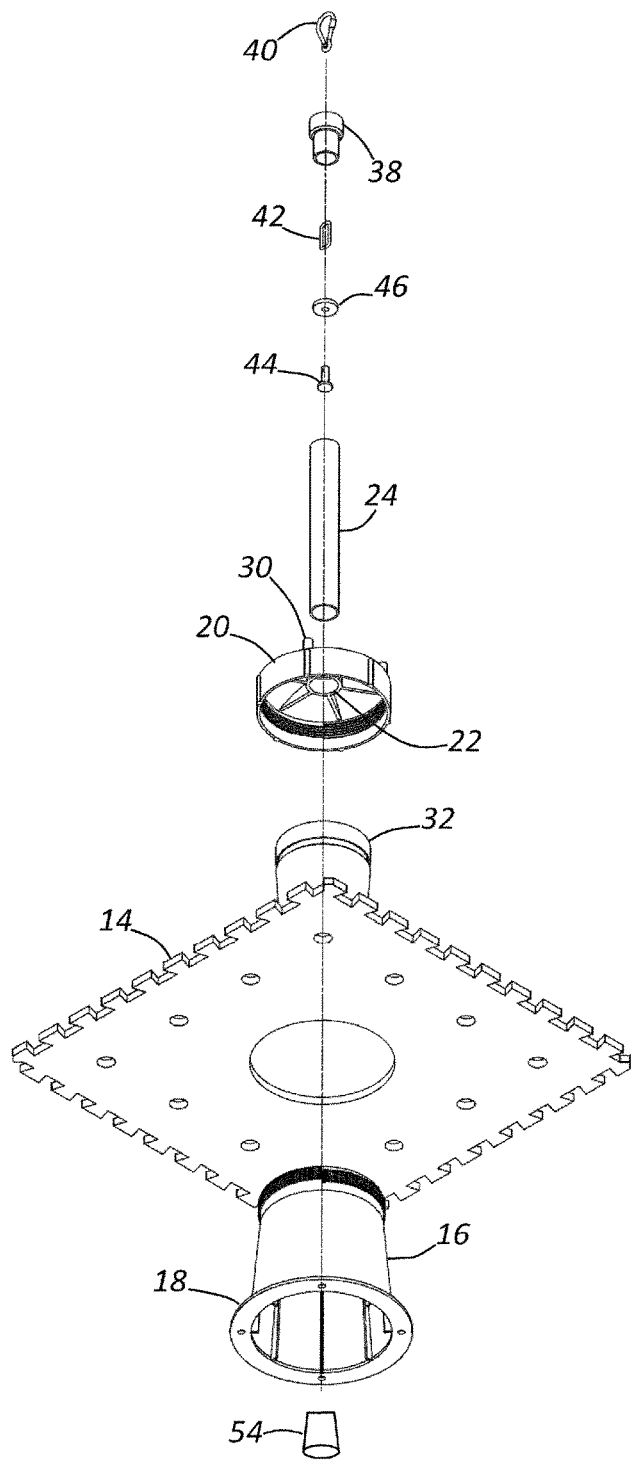
FIG. 3 is a perspective exploded view of the components of the restraint device of FIG. 1, without the umbrella.

FIG. 1 shows an embodiment of the present invention as a device 10 for restraining a dog 12. The device 10 has a platform 14 which is adapted to receive a base 16. A rim 18 of the base 16 holds it in the platform 14 (see FIG. 3). The base 16 has a lid 20 which has a hole 22 that supports a flexible shaft 24. The flexible shaft 24 is adapted to receive an umbrella 26 in one end of the shaft 24. The umbrella 26 provides shade for the dog 12.

A bowl 28 can be removably attached to the lid 20. Pins 30 on the lid 20 connect with holes 29 on the bowl 28 in order to support the bowl 28 on the lid 20. The bowl 28 is collapsible for ease of storage.

Figure 4:
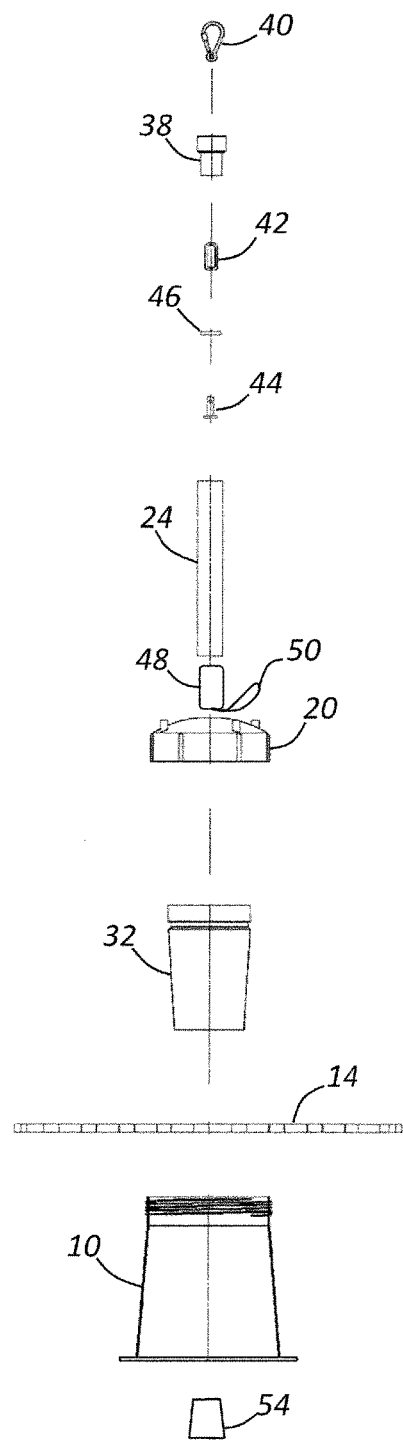
FIG. 4 is a side exploded view of the components of the restraint device of FIG. 1, without the umbrella.

The base 16 has a compartment 32 (see FIGS. 3 and 4) which is waterproof and air-tight. It can be used for storage of objects such as a user's keys, wallet or phone. The compartment 32 also has the capacity to hold water and food for the dog 12. The water or food can be dispensed via the bowl 28.

As shown in FIGS. 5 and 6, the flexible shaft 24 is adapted to receive a post 34 of the umbrella 26 in a first end 36 of the flexible shaft 24. At the opposite end of the flexible shaft 24 there is a shaft end cap 38 which holds a clip 40. A leash 42 of the dog 12 can be attached to the clip 40. The clip 40 is connected to a D-ring 43 which is connected to a swivel pin 44 through a washer 46.

A rotatable collar ring 27 is attached to the post 34 of the umbrella 26. A quick release spring clip 29 enables the leash 42 to be connected to the rotatable collar ring 27. The dog 12 can then run around the device 10 without its leash 42 becoming tangled or wrapped around the post 34 of the umbrella 26.

Figure 2:
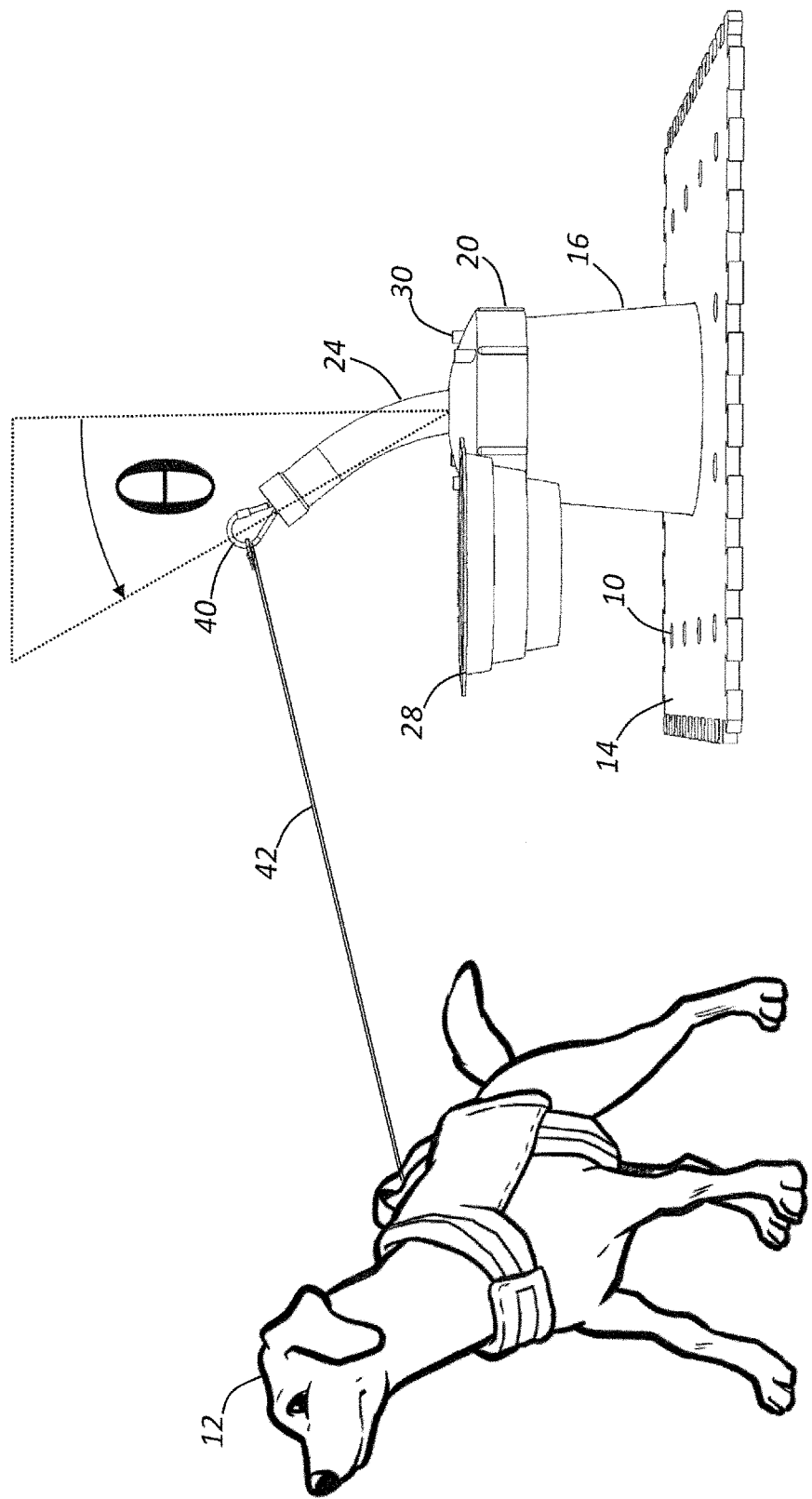
FIG. 2 is a perspective view of the restraint device of FIG. 1, without the umbrella attachment.

As shown in FIG. 2, the flexible shaft 24 can be positioned so that the clip 40 is upward. The leash 42 of the dog 12 can then be attached to the clip 40. In this embodiment of the invention, the umbrella 26 is not used.

The flexible shaft 24 is made of a composition of flexible polyurethane with the following properties:
Mix ratio: 35A:100B
Shore hardness: ~A90
Pour Time: 3 minutes (1-1 lb mix)
Demold Time: ~15 minutes
Mixed Viscosity: 3,000 cP Specific gravity: 0.81
Specific volume: 34 in³/lb
Maximum Exotherm: 190° F. (2-lb mass)

The flexible shaft 24 is so flexible that it would fold when pulled by the dog 12 on the leash 42 if not for a bung 48. The bung 48 is made of acetylene plastic. It provides rigidity to the flexible shaft 24. The bung 48 is jammed into the flexible shaft 24. At the point in which it is jammed it creates a bulge in the flexible shaft 24. The bulge holds the flexible shaft 24 against the hole 22 in the lid 20. The position of the bung 48 determines the height of the flexible shaft 24 in the bung 48. The height of the flexible shaft 24 can be increased for a large dog and decreased for a small dog. The bung 48 can be pulled out of the flexible shaft 24 by a draw string 50, which is affixed to the bung 48 using a nut 52.

As shown in FIG. 2, the shaft 24 is adapted to flex when the dog 12 moves away from the shaft 24. This enables the resistive force of the pole to increase with the increasing pull force of the dog, without providing an instant resistive force on the leash 42 which could otherwise choke the dog 12.

The flexible shaft 24 also confers an order of magnitude higher resistive force on the shaft 24 of the present invention than the rigid poles of the prior art. Rigid poles are easily levered out of the ground because all of the force exerted by the leash of the dog levers the base of the pole out of the ground.

A plug 54 is inserted into the end 36 of the flexible shaft 24. The plug 54 has sloping edges, with the bottom of the plug 24 being larger than the hole 22 in the lid 20. The plug 54 prevents the shaft 24 from being pulled out of the hole 22 in the lid 20 by the force of the dog 12 pulling on the leash 42 which is connected to the flexible shaft 24.

The platform 14 can be anchored to the ground by various means of fasteners (for example tent pegs) through the holes 56. The platform 14 can also be buried under sand, rocks or snow. In addition, the platform 14 could be bolted to concrete pavements outside cafes or veterinary surgeries, nailed to a timber deck, anchored to the tray of utility vehicles, anchored to the ground at camp sites, or in parks, alongside football fields, or on beaches.

The platform 14 has interlocking edges. This enables additional platforms to be connected to the central platform 14. This increases the surface area over which sand or other material can be deposited in order to cover the central platform 14 and anchor it to the ground. When the platform 14 is to be transported, two sides of the platform 14 can be wrapped around the base 16 and interlocked, so that the platform 14 forms a cylindrical shape. The restraint device 10 can then be packed into a bag for easy transport.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

That which is claimed is:

1. A restraint device for an animal, the restraint device comprising:
    a base to be attached to a ground surface;
        a flexible shaft having a proximal end supported in said base, and a distal end defining an opening; and
        a rotatable attachment point coupled to said distal end of said flexible shaft and to be coupled to a leash for the animal, said flexible shaft configured to absorb force from the leash;
        said rotatable attachment point comprising a swivel pin coupled to inner portions of said flexible shaft, and a clip coupled to said swivel pin and extending upward through the opening in said distal end of said flexible shaft.

2. The restraint device of claim 1 wherein a height of said flexible shaft is adjustable.

3. The restraint device of claim 2 further comprising a bung carried within said flexible shaft, said bung configured to adjust the height of said flexible shaft; wherein said bung causes said flexible shaft to bulge; and wherein said flexible shaft bulges adjacent an opening in said base and thereby affixes the height of said flexible shaft in said base.

4. The restraint device of claim 1 further comprising a platform coupled to said base.

5. The restraint device of claim 4 wherein said platform is configured to wrap around said base for transportation.

6. The restraint device of claim 4 wherein said platform is configured to be covered with material to provide stability for said base.

7. The restraint device of claim 1 wherein said base is configured to be attached to the ground surface.

8. The restraint device of claim 1 wherein said flexible shaft is configured to receive a shade implement.

9. The restraint device of claim 1 wherein said base includes a storage compartment.

10. The restraint device of claim 9 wherein said storage compartment is configured to hold water.

11. The restraint device of claim 1 wherein said flexible shaft includes a plug being affixed to proximal end of said flexible shaft within said base; and wherein said flexible shaft is wider than a hole in said base so that said flexible shaft cannot be fully withdrawn out of a top of said base.

12. A restraint device for an animal, the restraint device comprising:
    a base to be attached to a ground surface;
    a flexible shaft having a proximal end supported in said base, and a distal end defining an opening, said flexible shaft configured to have a height being adjustable;
    a rotatable attachment point coupled to said distal end of said flexible shaft and to be coupled to a leash for the animal, said flexible shaft configured to absorb force from the leash; and
    a platform coupled to said base and configured to wrap around said base to provide stability for said base;
    said rotatable attachment point comprising a swivel pin coupled to inner portions of said flexible shaft, and a clip coupled to said swivel pin and extending upward through the opening in said distal end of said flexible shaft.

13. The restraint device of claim 12 wherein said base is configured to be attached to the ground surface.

14. The restraint device of claim 12 wherein said flexible shaft is configured to receive a shade implement.

15. The restraint device of claim 12 wherein said base includes a storage compartment.

16. The restraint device of claim 15 wherein said storage compartment is configured to hold water.

17. The restraint device of claim 12 further comprising a bung carried within said flexible shaft and configured to adjust the height of said flexible shaft; wherein said bung causes said flexible shaft to bulge; and wherein said flexible shaft bulges adjacent an opening in said base and thereby affixes the height of said flexible shaft in said base.

18. The restraint device of claim 12 wherein said flexible shaft includes a plug being affixed to said proximal end of said flexible shaft within said base; and wherein said flexible shaft is wider than a hole in said base so that said flexible shaft cannot be fully withdrawn out of a top of said base.

* * * * *